United States Patent [19]

Brigance

[11] Patent Number: 4,650,426

[45] Date of Patent: Mar. 17, 1987

[54] SKILL EVALUATING APPARATUS AND METHOD

[75] Inventor: Albert H. Brigance, Eureka, Calif.

[73] Assignee: Curriculum Associates, Inc., Billerica, Mass.

[21] Appl. No.: 799,500

[22] Filed: May 23, 1977

[51] Int. Cl.$^4$ .............................................. G09B 19/00
[52] U.S. Cl. ................................ 434/322; 281/15 R; 434/178
[58] Field of Search ............ 35/48 A, 9 E, 9 F, 35 E; 281/15 R, 16; 283/45, 46; 434/178, 322

[56] References Cited

U.S. PATENT DOCUMENTS

| | | | |
|---|---|---|---|
| 212,772 | 2/1879 | Wakeman | 283/45 |
| 1,174,495 | 3/1916 | Harford | 283/63 A |
| 1,281,295 | 10/1918 | Cody | 35/48 A |
| 1,327,610 | 1/1920 | Billow | 283/63 A |
| 1,492,932 | 5/1924 | Orrell | 283/63 A |
| 1,500,777 | 7/1924 | Stevenson | 35/48 A |
| 1,717,435 | 6/1929 | Cocks | 281/16 |
| 2,234,075 | 3/1941 | Carolin | 281/15 R X |
| 3,208,772 | 9/1965 | Dahlstrand et al. | 281/15 R X |

OTHER PUBLICATIONS

Curriculum Associates Catalog 1976/77–"High Impact Skills Materials" published Mar. 1976.

Primary Examiner—William H. Grieb
Attorney, Agent, or Firm—Charles Hieken

[57] ABSTRACT

A loose-leaf book includes dividers having sections for evaluating student skills in readiness, word recognition, oral reading comprehension, word analysis, vocabulary, language arts, spelling, reference skills, numbers, operations, measurement and geometry and one facing page containing material observable by a student or other person whose skills are to be evaluated and the other facing page carrying instructions to the examiner or evaluator with any readable material on each page arranged in rows extending away from and generally parallel to the axis of the page-holding rings between facing pages and with a cover for one page attached around the rings covering designs to be observed by the student and hingeable so that the examiner may uncover the items for predetermined times and then instruct the student to draw them from memory. There is a student record book having means for recording the response of each person being tested on successive occasions with pencil and pens of different predetermined colors and indicating learning objectives for the period following the evaluation.

1 Claim, 6 Drawing Figures

| Name | Birthdate | School |
|---|---|---|

STUDENT RECORD BOOK*

Grade Level Test Profile: The results of Grade Level Tests included in the inventory may be graphed below to provide a summary of the student's progress.

Table of Contents

| | Page |
|---|---|
| Recording Procedures and Color Code | 1 |
| Grade Level Test Profile | 1 |
| Testing Observations | 1 |
| I. Readiness | 2 |
| II. Reading | 3–7 |
| III. Language Arts | 7–9 |
| IV. Math | 9–13 |
| Significant Observations | 14 |

GRADE LEVEL

| TEST | Pr | 1 | 2 | 3 | 4 | 5 | 6 | 7 |
|---|---|---|---|---|---|---|---|---|
| Word Recognition –Page 3 | | | | | | | | |
| Comfortable Reading Level – Page 5 | | | | | | | | |
| Reading Comprehension Level – Page 5 | | | | | | | | |
| Spelling – Page 8 | | | | | | | | |
| Math – Page 9 | | | | | | | | |

Recording Procedures and Color Code

A color-coded graphic profile of the pupil's progress is developed by using a pencil and pens of the colors listed below. Each evaluation is recorded in a different color. See the introduction of the Inventory of Basic Skills for additional instructions.

Testing Observations

Write the letters "S" or "N" and circle "Yes" or "No" in the designated box to describe the student's behavior/reaction during testing. Use a pencil or pen of the color indicated on the left.

S–Satisfactory    N–Needs to Improve

| Evaluation | Color | Date | Cooperative | Persistent | Attention Span | Concentration | Confidence | Rapport | Appeared to Hear Well | Appeared to See Well | Read with Expression |
|---|---|---|---|---|---|---|---|---|---|---|---|
| 1st | Pencil | | | | | | | | Yes No | Yes No | Yes No |
| 2nd | Blue | | | | | | | | Yes No | Yes No | Yes No |
| 3rd | Red | | | | | | | | Yes No | Yes No | Yes No |
| 4th | Black | | | | | | | | Yes No | Yes No | Yes No |
| 5th | Green | | | | | | | | Yes No | Yes No | Yes No |

Examiner _____

*FIG. 3*

I. READINESS

| TEST | PAGE | | |
|---|---|---|---|
| 1 | 2 | Color Recognition: | ˣRed  Blue  Green  Yellow  Orange  Purple  Brown  Black  Pink  Gray  White¹. |
| 2 | 3–4 | Visual Discrimination: | ˣ□ □ □ □ □ T  L  I  D  G  N  1  ˈs  d  d  e  no  new  bed  when  saw². |
| 3 | 5–6 | Visual Motor Skills: | ˣDraws: Circle,  Plus Sign,  Square,  ¹Triangle,  ²Diamond,  ³Double Triangle⁴. |
| 4 | 7 | Visual Memory: | kˣ   o+   o–l   ¹ lo+–   o+–Tl². |
| 5 | 8 | Body Image: | *Picture includes:* ˣhead  legs  eyes  nose  mouth  arms  trunk  ¹hands  ears  ²neck  feet³ |
| 6 | 9 | Gross Motor Coordination: | ˣWalks line,  Jumps on both feet,  Hops right foot,  Hops left foot,  ¹Skips². |
| 7 | 10 | Identification of Body Parts: | ˣNose  Hands  Eyes  Teeth  Mouth  Head  Legs  Back  Stomach  Chin  Jaw  Arm  Knee  Shoulder  Ankle  Hips  ¹Heel  Elbow  Wrist². |
| 8 | 11 | Directional/Positional Skills: | ˣUp,  Over,  Above,  Down,  In,  Out,  Top,  Behind,  Right,  Left,  ¹Front,  Back,  Under,  Beneath,  Beside,  Forward,  Backward,  Next to². |
| 9 | 12 | Fine Motor Skills: | Puts on coat,  Buttons,  Ties shoes,  Zipper,  Uses scissors,  Laces shoes. |
| 10 | 13 | Verbal Fluency: | ˣTwo words in combination,  Phrases,  Short sentences,  Asks simple questions,  ¹Shares past experiences in logical sequential order with understandable speech². |
| 11 | 14 | Verbal Directions: | *Remembers and executes how many verbal directions:* ˣ1  2  3  4¹. |
| 12 | 15–16 | Articulation of Sounds: | ˣP  B  M  W  /  H  T  D  N  /  K  G  NG  Y  /  F  J  WH  S  /  Z  ¹V  TH  SH  /  L  ²CH  R  BR  /  ³ST  SK  SP  TR⁴. |
| 13 | 17 | Personal Data Response: | *Gives verbally:* ˣName,  Age,  Address,  Phone number,  ¹Birthday,  Brothers,  Sisters,  Parents². |
| 14 | 18 | Sentence Memory: | *Repeats sentences of how many syllables:* ˣ2  4  6  ¹8  10  ²12  14  ³16  ⁴18  20⁵. |
| 15 | 19 | Counting: | *Counts by rote to:* ˣ1  2  3  4  5  6  7  8  9  10¹. |
| 16 | 19 | Alphabet: | *Recites to:* ˣA  B  C  D  E  F  G  H  I  J  K  L  M  N  O  P  Q  R  S  T  U  V  W  X  Y  Z¹. |

ORDINAL NUMBERS

SKILL: Knows the order of numbers.

DIRECTIONS: Point to the row of stick figures on the student page.

*Say: See these ten people. They are in a row or line. The line begins here at the door (point to the door on the student's left). Which one is first in line?*

If the student does not respond,

*Say: Can you show me the one who is first in line?*

If the student responds correctly, continue testing. Point to the figures, one at a time, in the order indicated below.

*Say: Which one is this one?*

Point to the figures in the order of 3rd, 2nd, 5th, 6th, 4th, 8th, 7th, 10th, and 9th.

— 51

OBJECTIVE: When presented with objects or pictures of objects arranged in a row, the student will give the ordinal number for each object placed in the line for a quantity of _____ or less with 100% accuracy.

— 52
— 53

Ordinal Numbers B-6

DISCONTINUE: After 2 consecutive errors.

TIME: Your discretion.

ACCURACY: Give credit for each correct response.

SKILL EVALUATING APPARATUS AND METHOD

BACKGROUND OF THE INVENTION

The present invention relates in general to evaluating skills and more particularly concerns novel apparatus and techniques for evaluating the basic skills of students, setting forth viable objectives for improving the skills of each evaluated individual during the period following evaluation and recording a succession of evaluations in a convenient manner to positively display the progress of each individual evaluated.

It is an important object of this invention to provide improved methods and means for evaluating skills.

It is a further object of the invention to achieve the preceding objects while simplifying and integrating evaluation, diagnostic record keeping, and objective setting procedures.

It is a further object of the invention to achieve one or more of the preceding objects while allowing the educator to conveniently assess each skill on a one-to-one basis.

It is a further object of the invention to achieve one or more of the preceding objects while facilitating the development of an individualized program to meet the special needs of each student.

It is still a further object of the invention to achieve one or more of the preceding objects while defining instructional objectives for each skill tested.

It is still another object of the invention to provide an immediate grade level performance record for use in evaluation over successive periods of instruction.

It is still a further object of the invention to achieve one or more of the preceding objects with techniques that do not require specialized training and are relatively easy to administer and score.

It is still another object of the invention to achieve one or more of the preceding objects with apparatus that is relatively inexpensive.

SUMMARY OF THE INVENTION

According to the invention, there is a single book means having a plurality of groups of separated facing pairs of pages with one facing page arranged for observation by the student or other person whose skills are being evaluated and the other by the examiner or evaluator with any printing being in rows extending away from and generally parallel to the edge of each facing page facing the other with the facing pages hinged about these facing edges, means for dividing each set of evaluations from the others, and means for recording the results of each evaluation for each student, the means for recording including marking means of different observable form for recording on the same pages successive evaluations of the same person evaluated to provide a convenient comparative record of the skills of each person evaluated. According to another feature of the invention, there is hinged cover means hingeably supported between facing pages for selectively covering portions of the page containing tests for the person evaluated. According to still another feature of the invention, the other facing page includes objective means setting forth in words the objective to be met in the feature for the particular evaluation on that page with appropriate blanks for signalling to the evaluator a specific numerical range of the objective to be met by the student being evaluated in the future.

According to the method of the invention, the examiner places the book with facing pages between the person being evaluated and the examiner, reads and follows the instructions, instructs the person being evaluated what to do with the material facing the person being evaluated and records the results of the evaluation with a predetermined marking means related to the evaluation order for that person being evaluated, and repeating the preceding steps at a later time while recording with marking means different from the preceding time on the same record pages.

Numerous other features, objects and advantages of the invention will become apparent from the following specification when read in conjunction with the drawing in which:

BRIEF DESCRIPTION OF THE DRAWING

FIGS. 3 and 4 are plan views of pages in a student record book;

FIG. 5 shows a class record book with a hinged panel for recording names; and

FIG. 6 is a plan view of an exemplary facing page arranged for observation by the examiner or evaluator illustrating the objective feature according to the invention.

DETAILED DESCRIPTION OF PREFERRED EMBODIMENTS

Figure 1:
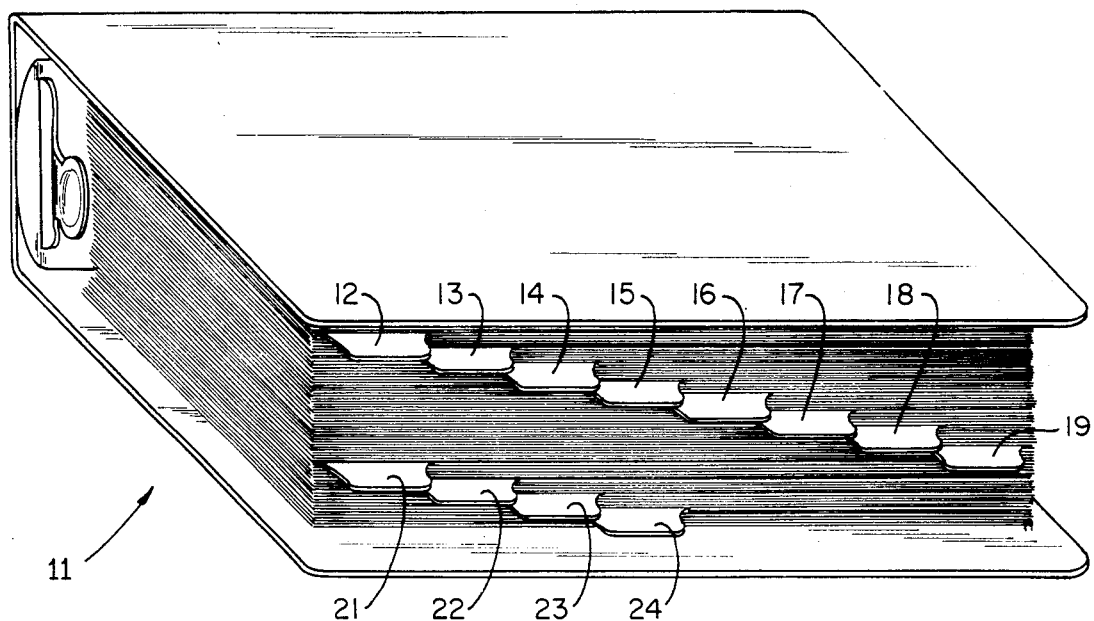
FIG. 1 is a perspective view of a testing book according to the invention.

With reference now to the drawing and more particularly FIG. 1 thereof, there is shown a perspective view of an embodiment of the invention which comprises a seven-ring loose-leaf book 11 with tabbed indexing dividers separating the embodiment into twelve sections and four groups of sections with each group identified by a different colored tab. Thus Group I covers readiness and includes a yellow tab 12. Group II comprises reading categories separated by orange tabbed dividers before sections on word recognition, oral reading comprehension, word analysis and vocabulary, 13-16, respectively. Group III embraces language arts sections separated by green tabbed dividers 17-19 including sections on spelling and reference skills. Group IV comprises mathematics sections separated by dividers with blue tabbed dividers 21-24 including sections on numbers, operations, measurement and geometry, respectively.

Figure 2:
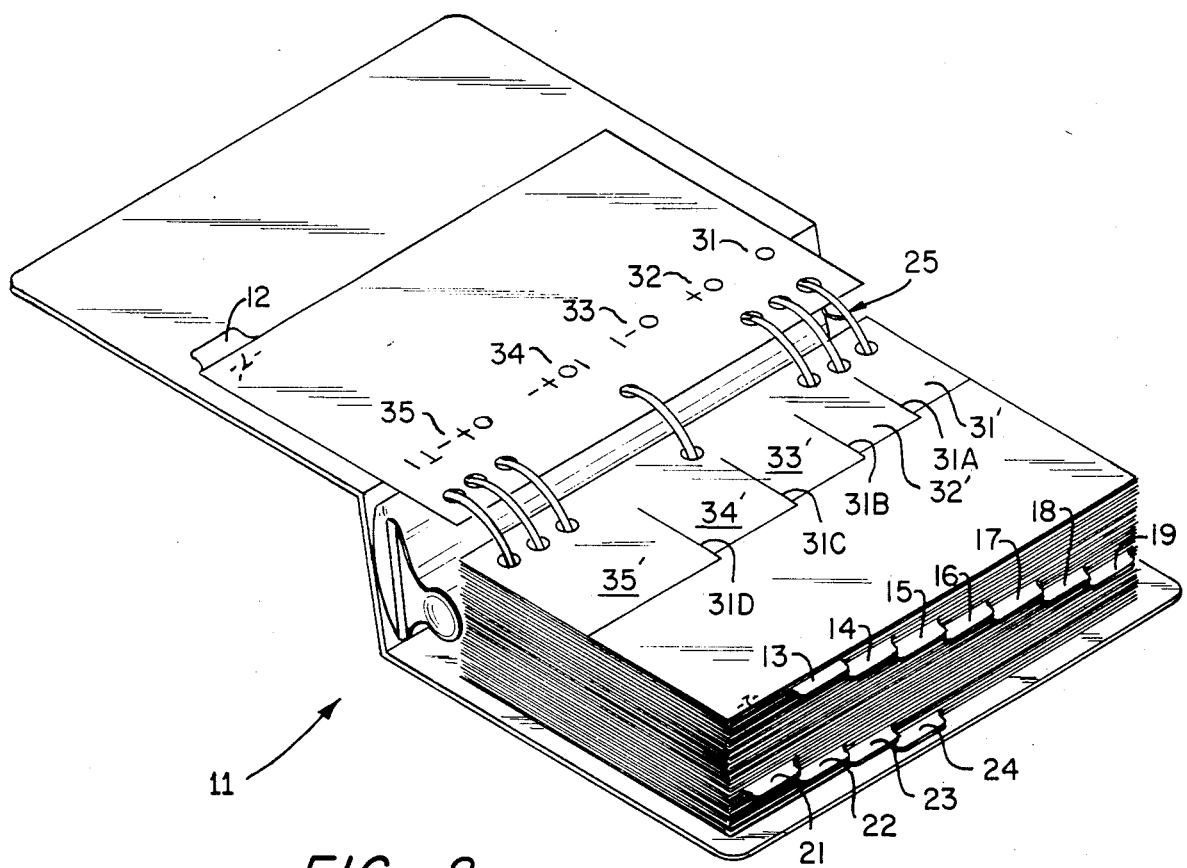
FIG. 2 is a perspective view of facing bags according to the invention with the hinged cover means raised.

Referring to FIG. 2, there is shown a perspective view of open facing means in the READINESS section for evaluating the visual memory skills of a student being tested. Examiner pages 7 is open so that as the examiner looks toward rings 25 and the long edge of the page facing student page 7', all the instructions and information is readily readable by the examiner and arranged in rows parallel to the long edge of the page facing the student being tested. At the same time all the test information on student page 7' is arranged in rows parallel to the long edge facing rings 25. Student page 7' includes five designs 31-35 of progressively increasing difficulty. A cover plate 36 of width sufficient to cover designs 31-35 is hinged on loose-leaf rings 25 for selectively covering patterns 31-35 and is formed with slits 31A-31D extending perpendicularly from the free lengthwise edge of cover plate 36 to a line just outside loose-leaf ring 25 to form five hingeable flaps 31'-35' for selectively covering designs 31–35, respectively. The examiner may then raise a flap for five seconds, allow the student to examine the exposed design and then instruct the student to draw the designs from memory.

Referring to FIGS. 3 and 4, there are shown first and second pages, respectively, in a student record book which facilitates recording the progress of a child. Note that each evaluation is recorded in a different color. The examiner circles each correct response in the color for that particular evaluation to thereby provide in a single book an immediate indication of the progress of the student being evaluated. The superscripts in FIG. 4 indicate the grade level associated with correct responses. Thus, a student only able to draw design 31 in FIG. 2 from memory after exposure to it for five seconds is at kindergarten level, one who draws designs 32 and 33 also, is at first grade level and one who draws designs 34 and 35 also, is at second grade level.

After the inventory of basic skill tests has been administered and scored, the teacher has a valuable base for developing a practical instructional program geared to the needs of the individual student with the assistance of the student record book, exemplary pages of which are illustrated in FIGS. 3 and 4. A written performance objective statement may be modeled along that set forth in the lower right-hand corner of the examiner's page for each skill tested and may include the components of what, how and how well.

The teacher may plan an academic program for the individual student based on suggested grade levels at which successive skills are commonly introduced and may select the objectives to be mastered during the next instructional period by underlining each objective in the student record book with the appropriate color for the next evaluation, thereby clearly defining the instructional objectives for everyone concerned with the student's progress. Thus, encircling in one color indicates level achieved while underscoring in a different color indicates level sought to be achieved on the next evaluation.

Figure 5:
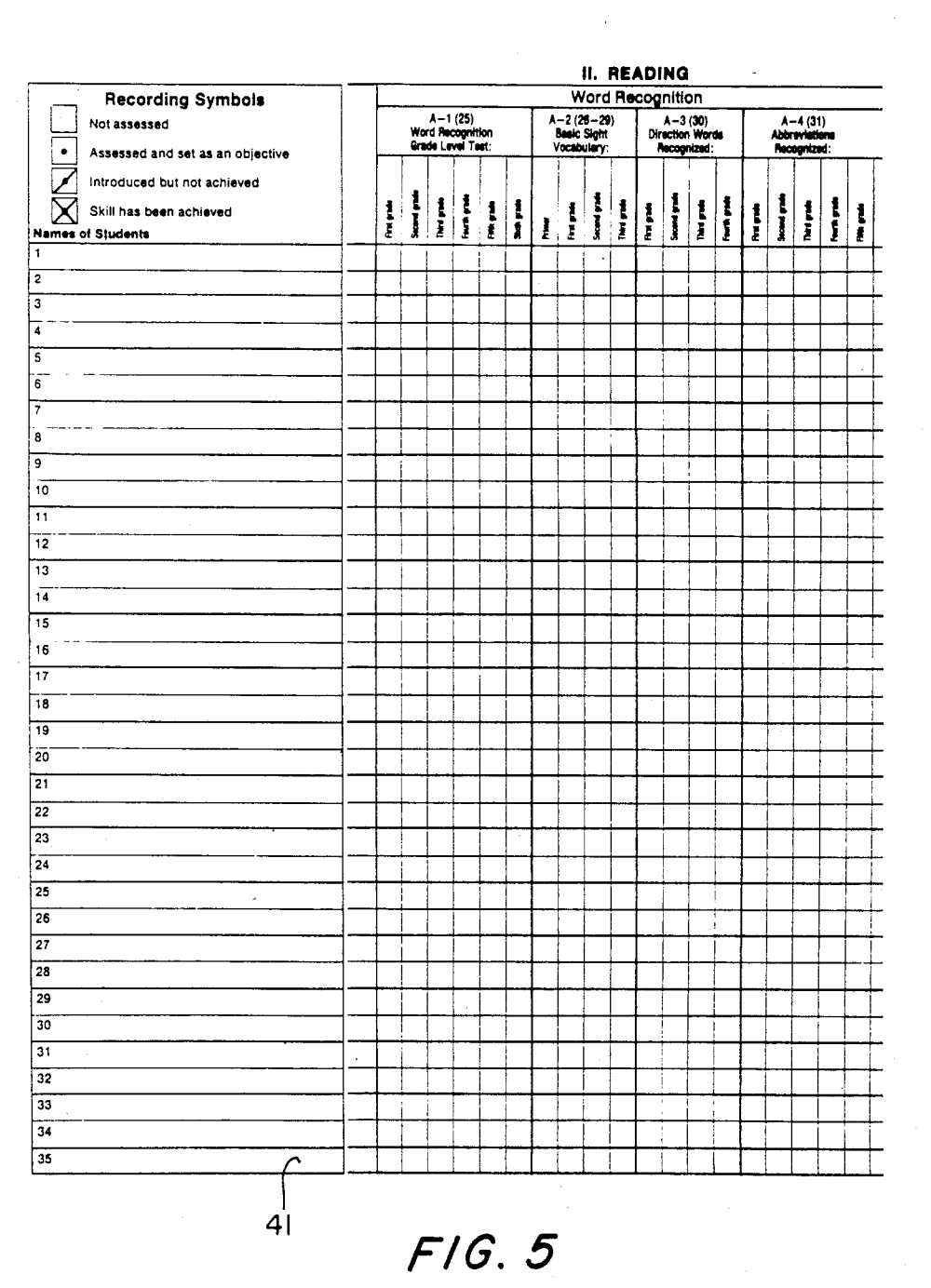

Record may also be kept of the progress of all the students in a class with a class record book setting forth for each skill whether it has been assessed and set as an objective, introduced but not achieved, and achieved. A feature of the class record book is arranging the skills at the head of columns, the names of students in rows on a succession of pages and having the cover of the class record book formed with a flap 41 as shown in FIG. 5 so that the names of the students need only be recorded once on the flap and the flap placed over the page where information is then being recorded.

Referring to FIG. 6, there is shown a plan view of a typical facing page arranged for observation by the examiner or evaluator, this specific page corresponding to page 111 in the commercial embodiment of the invention for evaluating skill in knowing the order of numbers. There is shown a box 51 beneath the skill setting forth directions together with instructions concerning discontinuing, time, and accuracy below. Another box 52 encloses an objective setting forth in words the specific objective to be met by the person being evaluated in the future with a blank 53 for association by the evaluator with a specific numerical value for the future objective. This objective feature is an important aspect of the invention for it enables the evaluator to immediately set forth in clear language future objectives to be met by the person being evaluated with a minimum of effort merely by collecting the objectives on the different pages observable by the examiner or evaluator with appropriate numbers in place of the blank or blanks setting forth specific numerical values or ranges.

A specific embodiment of the invention is the BRIGANCE Diagnostic Inventory of Basic Skills copyright 1976 and commercially available from Curriculum Associates, Inc., 6 Henshaw Street, Woburn, Mass. 01801, Catalog No. Z650, the associated student record book Catalog No. Z651 copyright 1976 and the associated class record book copyright 1977 Catalog No. Z660. These commercially available specific embodiments are incorporated herein by reference.

There has been described novel apparatus and techniques for evaluating skills and setting forth an individualized program for improving those skills and reevaluating them in a manner relatively easy to follow with relatively little training while conveniently providing results and programs in a compact economical package. It is evident that those skilled in the art may now make numerous uses and modifications of and departures from the specific embodiments described herein without departing from the inventibe concepts.

Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for evaluating skills comprising,
a plurality of pairs of opposed facing pages in a single volume formed with information aligned in rows generally parallel to the adjacent edges of the opposed pages with each pair of opposed pages including an examiner page arranged to be normally readable by the examiner when facing the person being evaluated and a student page being normally readily observable by the person being evaluated when facing the examiner,
said examiner page including instructions for the examiner and an objective for the examiner setting forth in words a specific objective to be met in the future by the person being evaluated on the subject matter of the skill associated with that page and including a blank portion for association with a specific numerical range as a future objective for the person then being evaluated.

* * * * *